United States Patent Office 2,783,177
Patented Feb. 26, 1957

2,783,177

WARFARIN SODIUM RODENTICIDAL COMPOSITION

Karl Paul Link, Middleton, Wis., assignor to Wisconsin Alumni Research Foundation, Madison, Wis., a corporation of Wisconsin No Drawing. Application March 17, 1952, Serial No. 277,080

3 Claims. (Cl. 167—46)

The present invention relates to improved rodenticide compositions and in particular rodenticide compositions for use in the preparation of water baits. The compositions comprise an alkali metal salt of an anti-coagulant 4-hydroxycoumarin derivative in combination with inert carriers of the type specified below. These combinations are stable and, as compositions suitable for use in the water bait practice, are characterized by their unique safety factor.

The 4-hydroxycoumarin derivatives suitable for use in the present invention are the 3-substituted type disclosed in U. S. Patent 2,427,578. These compounds are characterized by an enolic-OH group at the 4-position and a

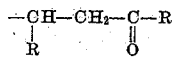

group at the 3-position, where the R's represent lower alkyl and phenyl groups including substituted phenyl groups such as alkyl, alkoxy and halogen substituted phenyl groups. Of the compounds in this group the compound known as warfarin (3-($\alpha$-acetonylbenzyl)-4-hydroxycoumarin) is outstanding, and for purposes of illustration the present invention is described with particular reference to the alkali metal warfarinates.

The rodent problem has been recognized as serious for many years. Rats and mice, for example, are known to consume and spoil large amounts of grain and other foods, spread filth and disease, kill chickens and the like, and even cause fires. The U. S. Government estimates that the rodents' annual board bill runs into the hundreds of millions of dollars, and that the rodents destroy many times what they eat. When one considers that this is only a part of the overall rodent bill paid by the public along with the estimate that there are many millions of rats and mice in the United States, the magnitude of the problem in this country alone is readily apparent.

Until the discovery of the anti-coagulant, warfarin, it had long been the established practice in the rodenticide field to employ very toxic rapidly acting stomach poisons of the "single dose" type such as strychnine or the more recently proposed sodium fluoroacetate. This latter product, known as "1080," is extremely toxic and its use is restricted to the professional or licensed pest control operators and the like. The use of poison substances of this type, particularly in the water bait practice, poses serious problems in use due to their equally toxic effect on humans and domestic animals. Also, investigations in the rodenticide field have shown that the rapidly acting poisons are not generally acceptable to the majority of the rodent colony, particularly after the toxic manifestations are apparent in the relatively few rodents (official colony food tasters) who initially test the new baits. This is known in the art as the development of "bait shyness."

With the development of warfarin a new concept—multiple dose baits—was introduced into the rodenticide field. Multiple doses of warfarin in relatively minute amounts in food baits, for example, have been found to produce high kills in both rats and mice within a few days. See Ross, Ward, Agricultural Chemicals, October 1951.

Up to the present time warfarin has been available commercially only for use in food baits. It has been sold as a concentrate made up of 0.5 part by weight of warfarin and 99.5 parts by weight of a diluent such as corn starch, one part of which mixed with 19 parts of food provides a desired bait containing 0.025% by weight of warfarin. Warfarin has also been sold as a finished bait made up of 99.975 parts by weight of food such as corn meal and 0.025 part by weight of warfarin. While compositions of this type have proven outstanding as food baits and are being used extensively today, the need for a composition for use in the water bait practice and in particular a relatively safe composition adaptable for use by the public at large as distinguished from professional exterminators, has urgently been desired by the rodenticide industry and by the users of rodenticides. In addition to eliminating food costs required for food baits, water baits are also preferred in many applications in rodenticide practice. Water baits, along with compositions used to prepare water baits, for example, are relatively stable and in this respect differ from finished food baits which are subject to the inherent defects of packaged foods, e, g, staling, rancidity, molding, insect infestation, etc., all of which can make the bait unpalatable to the rodent. See Ross, supra. Water baits are particularly desirable to control rodent population in and around grain storage elevators, mills, grain and other food processing establishments where food saturation exists and where sources of water are not readily available to the rodent. Rodent control in premises of this type is particularly important in view of the very extensive rodent contamination (rat hair, feces, etc.) recently found to exist in grain and products made from grain, especially wheat and corn, in long term research studies conducted by the U. S. Food and Drug Administration. See Harris, Kenton L., et al., An Investigation of Insect and Rodent Contamination of Wheat and Wheat Flour, Journal of the Association of Official Agricultural Chemists, February, 1952.

It is essential in the water bait practice for the rodenticide compositions to be readily soluble in cold water in sufficient amounts to produce high kills. It is also essential that the resulting bait solutions be free from "off-tastes" to be acceptable to the rodent. Warfarin itself (along with the related 3-substituted-4-hydroxycoumarins) is only very slightly soluble in water and goes into solution with difficulty, and is therefore not suitable for use in water baits or compositions used to prepare water baits. It has been found, however, that warfarin can be reacted with alkali metal hydroxides, such as sodium or potassium hydroxide, without opening the lactone ring, to form a water soluble salt 3-($\alpha$-acetonylbenzyl)4-hydroxycoumarin, sodium derivative, (referred to herein as the alkali metal salt of warfarin or alkali metal warfarinate), and that the resulting alkali metal salt is very soluble in water, e. g., 60 grams of sodium salt per 100 cc. of water forms a stable solution at 25° C. It has also been found that the alkali metal warfarinates are highly toxic to rodents and when free from free alkali as well as degradation products which lend taste or odor to the salts, are particularly adaptable for use in water baits and compositions used to prepare water baits. The salts may be prepared by reacting warfarin with dilute aqueous alkali solutions under conditions specified below. The sodium salt, for example, is preferably made at room temperature by reacting one mole of substantially pure warfarin with slightly less than one mole of sodium hydroxide in aqueous solution, followed by removal of excess warfarin by filtration. The sodium warfarinate obtained by this procedure contains no free alkali or deleterious degradation products and may be obtained in solid form if desired by removal of the water by evaporation preferably under reduced pressure.

With the preparation of the alkali metal salts of warfarin free from free alkali, etc., satisfactorily solved and their effect in water baits demonstrated, the problem of getting the salts into a safe, practical form for marketing only remained. This is of utmost importance in the rodenticide field as a practical rodenticide composition should have a maximum safety factor as far as humans and domestic animals are concerned and at the same time be readily adaptable for use with the minimum of effort. Also the compositions should be stable in and out of water, as baits containing materials which have undergone deterioration are not readily acceptable to the rodent.

The marketing of the alkali metal warfarin salt per se as a powder for addition to water was discarded as the presence of large amounts of available warfarin in concentrated form presented an extreme hazard to both humans and domestic animals. Also, warfarin salts unless free from free alkali tend to be hygroscopic in nature and cake, e. g., become glassy in character upon storage in containers, making accurate measurements for addition to water difficult. To overcome some of these disadvantages the use of capsules and tablets containing the desired percentage of warfarin salt for addition to specified amounts of water were investigated. Aside from the fact that trouble was encountered in preparing satisfactory capsules and in obtaining stable tablets that would dissolve readily when added to water, these routes were also discarded due to the hazard involved in having concentrated warfarin available to humans and in particular available in a form attractive to children. There has also been investigated the distribution of concentrated solutions of warfarin salts to be added to water by the user and the distribution of a final dilute water bait ready for use "as is." The former was discarded due to the great hazard referred to above and the latter was found impractical due to lack of economy in handling and shipment of such large quantities of water, breakage of containers if glass or the like is used, corrosion of metal containers, etc.

Many attempts were made to provide a practical rodenticide composition adaptable for use in the preparation of water baits having the desired safety factor for use by the public at large. The challenge presented resided in providing a satisfactory composition that would have at least as high or better safety factor than the warfarin concentrates suitable for making food baits and the finished warfarin food baits. This involved among other things the acceptability of the resulting bait solutions, as baits which are not readily acceptable to the rodent have proven in practice substantially worthless. The problem remained unsolved until I discovered the compositions of the present invention comprising special types of inert carriers characterized below in combination with the alkali metal (alkali-free) salt of warfarin.

My investigations have demonstrated that the carrier should be substantially odorless, tasteless, insoluble in water and biologically and chemically stable. My investigations have also demonstrated that the carrier should be of the non-edible type and should be unsuitable for poisoning of humans by intent, i. e. homicides or suicides. The characteristics—substantially odorless, tasteless, etc.—are essential to provide water bait solutions acceptable to the rodent. In addition, the carrier should not "bind" the salt of warfarin in solution, i. e., should be such that the salt is readily released and goes into solution quickly when the mixture is added to water. Particles of inert inorganic or mineral materials such as sand have proven in practice to be satisfactory carriers. While the salts of warfarin may be prepared in solid form and then added to water for application to the inert carrier, this is not necessary and the preferred and most economical practice is to prepare the warfarinate in solution form and then treat the carrier with the solution as described below.

PREPARATION OF Na-WARFARINATE SOLUTION

To 865 grams of distilled water 32.4 grams of sodium hydroxide (analytical reagent minimum purity 97%) is added and the mixture stirred until the sodium hydroxide dissolves. To this solution is next added 250 grams of rodenticide grade (substantially pure) essentially odorless and tasteless warwarin, and the resulting mixture then stirred vigorously for about ten minutes until the solution shows a pH of about 8.0 as tested, for example, with Hydrion A pH paper. A slight excess of warfarin (5.0 grams of warfarin is satisfactory) is then finally added to insure complete conversion of the sodium hydroxide to the sodium warfarinate and the solution filtered with or without a filter aid. The excess (undissolved) warfarin is recovered in the filtration operation and may be reused for subsequent batches. The final clear solution contains approximately 23.4% by weight of sodium warfarinate (or 21.8% by weight on the warfarin basis) and is ready for use in Example I as described below. Solutions of different warfarinate concentrations up to approximately 60% may be readily prepared by varying the amounts of ingredients, although in all cases, excess warfarin should be present in the reaction mixture to insure that the solutions contain no free alkali for warfarin undergoes degradation on standing in the presence of free alkali, with the rate of degradation increasing materially at higher temperatures.

The following examples will serve to illustrate the present invention:

*Example I*

About 944.91 grams of a good quality of clean, washed previously screened standard 20–30 mesh sand, is dried at 95–100° C. for about three hours in a well ventilated tray oven. To the dried sand after cooling is next added slowly with stirring 20.0 cc. of a 21.8% by weight aqueous sodium warfarinate solution. The warfarinate-sand mixture is then dried for about three hours at 50–60° C. At the start of this drying operation, there is a tendency for the surface of the sand mix to cake. This should be broken up by stirring. After completion of the drying operation the product is allowed to cool to room temperature and is then ready for packaging.

The product obtained as described above contains about 5.09 grams of sodium warfarinate which is equivalent to 4.75 grams of warfarin or about 0.5% by weight of warfarin on a dry weight basis. About 9.5 grams of the dry product thus contains about 47.5 mg. of warfarin which, when added to one quart of water (946.4 cc.) with stirring, makes a satisfactory fountain bait containing about 0.05 mg. of warfarin per cc.

*Example II*

To about 938.82 grams of 20–40 mesh clean, washed sea sand previously dried and cooled as described in Example I, is added with stirring about 20.0 cc. of a 43.6% by weight aqueous sodium warfarinate solution. The warfarinate-sand mixture is then dried as described in Example I. The dry product obtained by the process of Example II contains 1.0% by weight of warfarin and 4.75 grams of this product added to one quart of water also gives a satisfactory water bait containing about 0.05 mg. of warfarin per cc.

PREPARATION OF 50% (BY VOLUME) Na-WARFARINATE SOLUTION

To about 500 ml. of distilled water, add 64.960 g. (1.6240 moles) of analytical reagent sodium hydroxide (minimum purity 97%). Stir the solution until the sodium hydroxide dissolves. To this alkaline solution add 505 g. (500 g. and 5 g. excess) of rodenticide grade warfarin (1.6240 moles, not including excess). The mixture should be stirred vigorously for about 15 minutes until solution shows pH of 8.0 as tested with Hydrion A pH paper. A slight excess of warfarin (5 g.) is added to insure complete conversion of the NaOH to the sodium warfarinate. The excess of warfarin will partly go into solution but some can be recovered by filtration and re-used for subsequent batches. The resultant solution is diluted to 1000 ml. with distilled water and shaken to insure complete mixing. The final solution is slightly greater than 50% by volume with respect to warfarin.

*Example III*

To about 19 grams of clean, washed 20–30 mesh sand previously dried as described in Example I is added with stirring 2 cc. of a 50% by volume of aqueous sodium warfarinate. The product is then dried as described above and contains about 5% by weight of Na-warfarinate. One gram of this product contains about 50 mg. of warfarin which when added to 1 qt. water provides a final water bait containing about 0.05 mg. of warfarin per cc.

*Example IV*

About 400 cc. of a 50% by volume of aqueous sodium warfarinate is sprayed on 1800 grams of clean, dry 20–50 mesh sand while the sand is vigorously tumbled in an enclosed mixer. After drying as above the final product contains about 10% by weight of sodium warfarinate of which 0.5 gram added to one quart of water yields a final water bait containing about 0.05 mg. of warfarin per cc. For practical purposes the carrying capacity of sand has been found to be about 10% by weight of warfarin.

*Example V*

In accordance with the above examples a product containing 0.1% by weight of warfarin is made by spraying 10 cc. of a 10% by volume solution of sodium warfarinate on 999 grams of clean, washed sand. About 11.83 grams of this product added to one liter of water provides a bait containing about 0.0125 mg. of warfarin per cc.

*Example VI*

In accordance with the above examples a product containing 2.5% by weight of warfarin is made by spraying about 125 cc. of a 20% by volume solution of sodium warfarinate in 975 grams of clean, washed sand. About 0.95 grams of this product added to one quart of water provides a bait containing about 0.025 mg. of warfarin per cc.; about 1.9 grams of this product added to one quart of water provides a bait containing about 0.050 mg. of warfarin per cc.; and about 2.84 grams of this product added to one quart of water provides a bait containing about 0.075 mg. of warfarin per cc. With 20–50 mesh sand, compositions containing 0.1–10.0% by weight of warfarin are satisfactory for making up water baits of varying concentrations although compositions containing 0.5–5.0% and especially 2.5% are generally preferred.

The sand or like carrier material, in addition to the characteristics noted above, should be of good quality and be free from water soluble impurities. Clean and washed Illinois standard sand sold by the Ottawa Silica Company and white sea sand sold by E. H. Sargent and Company are illustrative examples of satisfactory sands. For proper impregnation and coating with the warfarinate the sand should be essentially free from calcareous material as well as clay or like materials which tend to form films on the sand. Also, for desired retention of the warfarinate on the sand, the sand should be dry (free from a water film) at the time it is treated with the warfarinate solution. Tests carried out in this connection have demonstrated that the warfarinate is firmly bound and does not flake off of the sand during handling, etc. when the sand meets the specifications noted above. Extended tests have also demonstrated that the warfarinate on the other hand is readily released and goes into solution practically instantaneously when the warfarinate-sand composition is added to water.

The binding capacity of the sand for the warfarinate salt is unexpected and at the lower concentrations of warfarinate on sand truly remarkable. While the phenomenon is not fully understood it may be due in part to electrostatic effects. This is possible due to the relatively large surface of sand exposed. The binding capacity may also be due in part to chemical effects resulting from the ionization of the sodium warfarinate in solution. It is possible, for example, that the $Na^+$ and $OH^-$ ions present in the solution react with the sand ($SiO_2$) to form some sodium silicate in situ, and, upon drying, that the adhesive silicate aids in cementing the sodium warfarinate (along with free warfarin) to the sand. Regardless of the theory involved investigations have shown that 20–50 mesh sand carying up to about 10% available warfarin as the alkali metal salt are satisfactory for use in the present invention. Shaking tests in this connection have also shown compositions containing up to about 2.5% by weight of warfarin on sand to be substantially free from flaking, i. e., loss of warfarin salt from the surface of the sand, even when conducted over extended periods of time.

When it is desired to avoid the cost of transporting large amounts of relatively heavy materials such as sand, I have discovered that higher concentrations of the warfarinate may be initially impregnated on an intermediate product such as diatomaceous earth or like adsorbent material. The resulting product, shipped in the bulk, lends itself to relatively low cost transportation charges. However, before packaging for use by the public it is preferably mixed with a major proportion of sand or like gritty material. The following examples will serve for illustrative purposes.

*Example VII*

To 20 grams of a good grade of dry diatomaceous filter aid is added with stirring 20.0 cc. of a 21.8% by weight aqueous solution of sodium warfarinate. The resulting mixture is then dried at about 50° C. for about 4–6 hours. The resulting dry concentrate contains 19% by weight of warfarin and is added to sand preferably in a ratio of about 2.51 grams of diatomaceous earth-sodium warfarinate to 95 grams of sand. A composition made up of 0.251 grams of the diatomaceous earth-warfarinate product and 9.5 grams of sand when added to a quart of water provides a bait solution containing about 0.05 mg. of warfarin per cc.

*Example VIII*

This example follows the procedure of Example VII except that in place of the diatomaceous earth 10 grams of a filter aid such as the product known as Super-Cel is employed. The final product after drying contains about 32% by weight of warfarin and is ready for mixing with sand. A composition made up of 0.151 gram of this filter aid-warfarinate product and 9.5 grams of sand when added to a quart of water provides a bait solution also containing about 0.05 mg. of warfarin per cc. In place of Super-Cel other materials available on the open market such as Celite, Dicalite and the like and asbestos may also be employed as the intermediate product. In addition, water insoluble organic adsorbents such as purified wood cellulose available on the open market as Polycel, Solka-Floc, etc. as well as water insoluble cellulose derivatives e. g. cellulose ethers such as Ethocel may also be employed as the intermediate product. Compositions containing these materials are prepared by the procedures described in Examples VII or VIII.

Example IX

In accordance with the above examples, 9.5 grams of asbestos of the woolly type is mixed with 20 cc. of about a 20% by weight of aqueous sodium warfarinate solution. After drying at 50-60° C. the product is ready for packaging. About 0.18 grams of the resulting dry product mixed with about 12 grams of sand or the like and added to one quart of water provides a water bait containing about 0.05 mg. of warfarin per cc. The asbestos product along with the cellulose products referred to above may be made into ball or cockle-burr like structures into which gritty particles like sand are incorporated by addition of a water soluble, stable gum-like material such as methyl cellulose.

The compositions of the above examples contain only about 0.1-10.0% by weight of available warfarin and are relatively safe to humans and domestic animals. The percentages of warfarin present in the compositions should be such that a small amount when added to water, e. g. about 0.5-12 grams to a quart of water, will provide a solution containing about 0.0125-0.075 mg. and preferably 0.05 mg. of available warfarin per cc. Compositions herein described are satisfactory for use in the water bait practice and at the same time have the desired high safety factor.

I have also found that the warfarinate solutions may be added to adsorbent pads such as cellulose blotting pads and that the resulting pads when added to water release the warfarinate and form water baits of the type desired. For example, when 0.2 cc. of a 21.8% sodium warfarinate solution is added to a small piece of cellulose pad it provides a product containing 47.5 mg. of warfarin. This product when added to a quart of water also provides a satisfactory water bait containing about 0.05 mg. of warfarin per cc. Gritty and like abrasive material such as sand and the like should preferably be incorporated in the pads to make them unpalatable to humans. This can be readily done with adhesives such as methyl cellulose, dextrin, etc. without affecting the acceptability of the final bait to the rodent.

Example X

|  | Grams |
|---|---|
| Cellulose pad | 0.50 |
| Waterglass | 0.10 |
| Sand | 0.50 |
| Na-warfarinate | [1] 0.051 |
| Total weight | 1.151 |

[1] .047 warfarin.

The washed sand (20-30 mesh) is pasted on the pads with the sodium silicate (waterglass) in aqueous solution and dried e. g. with heat lamps or warm air, etc. The sodium warfarinate in aqueous solution is then applied to the other side of the pads and after drying the pads are ready for packaging. A product of this type when added with shaking to one quart of water yields a final water bait containing about 0.05 mg. of warfarin per cc. This combination is unique in that the sand or like abrasive renders the product unpalatable and the sodium silicate used as the adhesive upon addition to water raises the pH which in turn aids in keeping the sodium warfarinate as the sodium derivative and retaining the free warfarin in solution. This combination is also unique in that it is not likely to be eaten because of its unpalatability or chewed, as, for example, by a child because of the presence of the gritty or abrasive material. Any of the alkali metal silicates may be used although the use of a silicate with a low $Na_2O$ ratio is generally preferred.

Natural waters are generally around pH 7.0 and are satisfactory for use in the preparation of the final baits. Where necessary sodium bicarbonate may be added to raise the pH of highly acid waters.

The addition of sugars to the rodenticide composition or bait solutions made therefrom are not recommended but materials such as glycerine, sorbitol, mannitol, saccharin and the sweetening agent known as Sucaryl may be added in small amounts if desired. Salt (NaCl) up to about 0.055% may also be added to the rodenticide compositions or bait solutions. Suitable dyes may be added to color the water of the final bait or the rodenticide compositions. For example, the dye may be incorporated in the compositions of the present invention by addition to the warfarinate solution before application to the carrier or by addition to the carrier prior to application of the warfarinate solution. If a dye is used it should be substantially odorless and tasteless and stable at the pH ranges in the solutions in which it is used.

The rodenticide compositions of the present invention are biologically stable and have proven in practice easy to handle and not to require the services of professional licensed exterminators. The warfarin salts unlike certain poisons such as the phosphorous compounds are also chemically stable. The action of the compositions in the water on the one hand are sufficiently rapid to provide for effective kills and on the other hand sufficiently slow so that the official tasters do not have a chance to warn the rodent colony of impending danger. The rodents also do not know what is taking place, i. e., they are subject to no pain and in many instances have been found dead or dying at or near the bait stations.

The action of the rodenticide compositions or baits made therefrom if accidentally taken by man, domestic animals, etc., may be readily combatted by administration of vitamin K. There is no retention of the anticoagulant in the body and no permanent damage is done. The compositions and final baits therefore have a safety factor which is unique in this respect. In addition, at the dosages employed, i. e., the relatively small percentage of available warfarin present, the compositions and baits made therefrom have proven relatively non-toxic to other animals when used in accordance with the generally preferred practice in quart containers. The preferred compositions also contain a large amount of the inert gritty type carrier and are not attractive to humans, children as well as adults, or to domestic animals. In this respect they differ materially from food baits. The compositions of the present invention thus combine effective killing power in the rodent with a relatively high degree of safety to the handlers and those accidentally exposed to their action.

While the invention has been illustrated with particular reference to alkali metal warfarinate, any of the 3-substituted 4-hydroxycoumarin compounds referred to above may be used in place of warfarin. However, as pointed out above, warfarin is outstanding and it is preferred to use sodium warfarinate in the novel combinations described.

I claim:
1. A rodenticide product for use in the preparation of water baits consisting of sand coated with sufficient 3-(α-acetonylbenzyl)-4-hydroxycoumarin sodium to provide the product with about 0.1-10% by weight of 3-(α-acetonylbenzyl)-4-hydroxycoumarin, said coating being formed by applying an aqueous solution of 3-(α-acetonylbenzyl)-4-hydroxycoumarin sodium free from free alkali to dry, clean, washed sand and drying the same thereon, said coating being characterized by being firmly bound to the sand when dry and being readily released in solution when contacted with water.

2. The composition of claim 1 where the sand is 20-50 mesh and the composition contains 0.5-5.0% by weight of available 3-(α-acetonylbenzyl)-4-hydroxycoumarin.

3. The composition of claim 1 where the sand is about 20-30 mesh and the composition contains about 2.5% by weight of available 3-(α-acetonylbenzyl)-4-hydroxycoumarin.

References Cited in the file of this patent

UNITED STATES PATENTS

| | | |
|---|---|---|
| 1,270,630 | Leist | June 25, 1918 |
| 1,450,128 | Baker | Mar. 27, 1923 |
| 1,572,568 | Smith | Feb. 9, 1926 |
| 2,427,578 | Stahmann | Sept. 16, 1947 |

OTHER REFERENCES

"Raticidal Potentialities of Warf—42," by D. Glenn Crabtree, February 1950, in Soap and Sanitary Chemicals.

"Controlling Rats and Mice with Warfarin," Publication of October 1950, Prenticess Drug and Chemical Co., Inc., 110 William St., N. Y.